Dec. 1, 1964   R. H. MILLER ETAL   3,159,036
ENGINE SPEED LIMITING MEANS RESPONSIVE TO
LUBRICATING OIL PRESSURE
Filed April 11, 1963   2 Sheets-Sheet 1
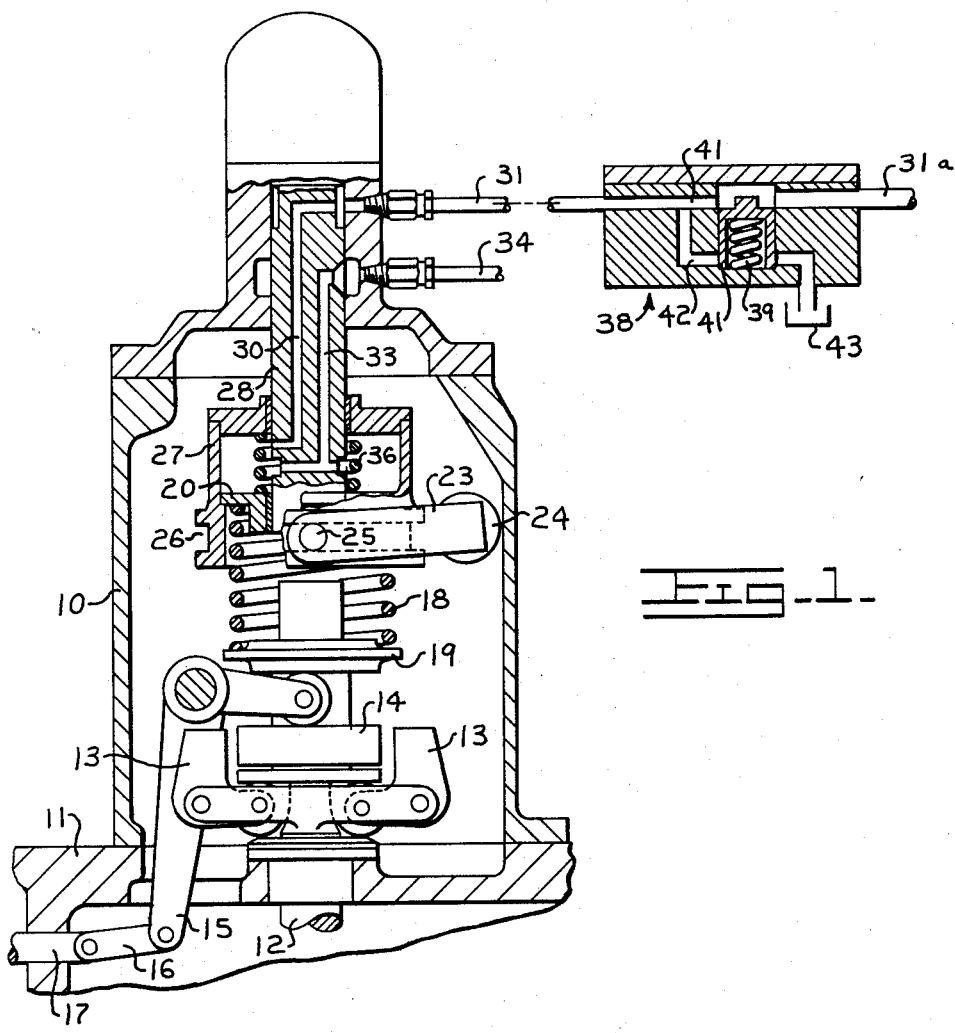
Fig-1-
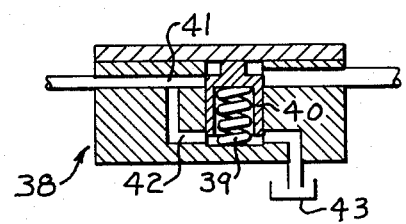
Fig-2-
INVENTORS
Robert H. Miller
BY John H. Parks
ATTORNEYS

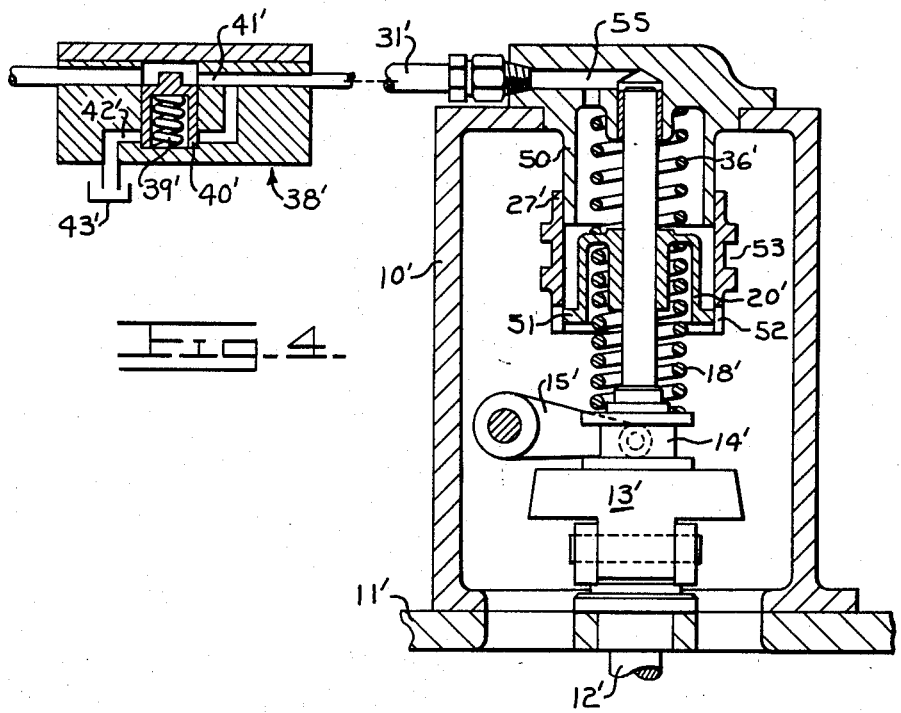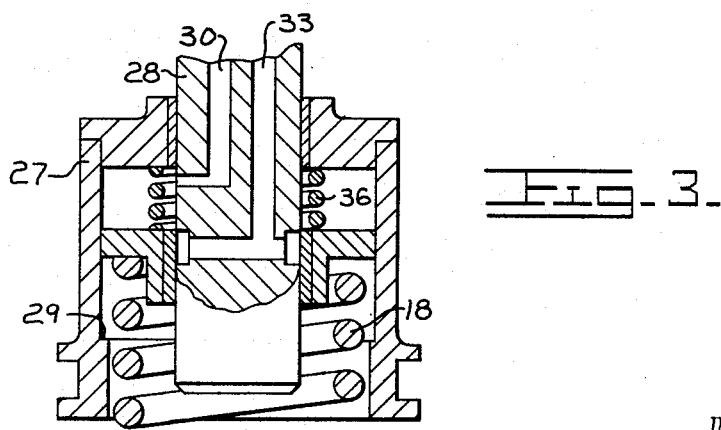

United States Patent Office 3,159,036
Patented Dec. 1, 1964

3,159,036
ENGINE SPEED LIMITING MEANS RESPONSIVE TO LUBRICATING OIL PRESSURE
Robert H. Miller and John H. Parks, Peoria, Ill., assignors to Caterpillar Tractor Co., Peoria, Ill., a corporation of California
Filed Apr. 11, 1963, Ser. No. 272,312
4 Claims. (Cl. 73—509)

This invention relates to means for limiting speed of an internal combustion engine when lubricating oil pressure in the engine is below a predetermined value.

Difficulties have been encountered in engines damaged as a result of operation at high speed immediately after starting and before lubricating oil pressure has arisen to a value at which adequate lubrication has reached all necessary engine parts. Another cause of damage is failure of the lubricating system permitting a pressure drop and inadequate lubrication after the engine has been operating for a period of time. In the latter case, it is undesirable to shut the engine down entirely because in the case of a vehicle engine, the vehicle may be stalled on a road or in a dangerous or undesirable place. By providing means which limit engine speed without completely shutting it down, the operator is warned of engine failure but has power available to move the vehicle to a safe position before manually shutting the engine down.

It is the object of the present invention to provide a simple, inexpensive and positively acting means to prevent high speed operation of an engine after starting until adequate lubrication has been insured and to reduce engine speed without completely shutting down in the event of pressure drop in the lubrication system during operation.

Further and more specific objects and advantages and the manner in which the invention is carried into practice will be made apparent in the following specification wherein the invention is described in detail by reference to the accompanying drawings:

In the drawings:

FIG. 1 is a vertical sectional view through a governor of the spring balanced type showing the present invention applied thereto;

FIG. 2 is a view in similar section of a valve shown in FIG. 1 illustrating the parts thereof in different positions;

FIG. 3 is a fragmentary section of a portion of the governor illustrated in FIG. 1 illustrating the position of the parts assumed when the speed of the governor has been limited by pressure failure in the lubricating oil system of an engine; and FIG. 4 is a vertical sectional view of a different type of governor showing the application of the present invention thereto.

The governor illustrated in FIG. 1 is of the kind illustrated in the John H. Parks United States Patent No. 2,994,225 for "Hydraulically Controlled Decelerator for Engine Governor." An understanding of the present invention will be facilitated by a brief description of the operation of the governor with which it is shown. The governor housing 10 is illustrated as secured to a surface 11 of a part of the fuel injection mechanism of an internal combustion engine, not shown. The governor comprises a conventional spindle shown at 12 driven by the engine itself through gears, not shown, and carrying a pair of pivoted flyweights 13 which swing outwardly in response to engine speed to raise an anti-friction thrust collar 14 which through a lever 15 and link 16 actuates a fuel control member. In the present instance the fuel control member is shown as a rack bar, a portion of which appears at 17 and the function of which is to angularly adjust the scroll-type pistons of a set of fuel injection pumps to vary the fuel supply to the engine in a conventional and well known manner.

Outward movement of the flyweights 13 tends to decrease the fuel supply and resistance to this outward movement is afforded by a main governor spring 18 of the compression type, one end of which engages a seat 19 formed integrally with the thrust bearing 14 and slidable therewith on the spindle 12. The opposite or upper end of the governor main spring 18 rests against a spring seat 20, which in conventional governor operation is raised and lowered to vary the load on the spring 18, and thereby vary the force required by the flyweights to reduce fuel supply to the engine. Variation of the position of the spring seat 20 is accomplished by a control lever, not shown, operable through suitable linkage to rock a yoke 23 about its pivotal support 24. This yoke has pins 25 disposed in a groove 26 on a member which controls the position of the spring seat 20. The member which controls the position of the spring seat is in the form of a cylinder 27 vertically slidable on a post 28 supported by the top of the governor housing and extending downwardly thereinto in alignment with the spindle 12. The spring seat 20 is slidable within the cylinder 27 in the manner of a piston and its downward sliding movement is limited by a shoulder 29 in the cylinder best shown in FIG. 3. With this construction liquid locked in the cylinder 27 above the spring seat 20 prevents sliding movement of the spring seat or piston in the cylinder so that adjustment of the main governor spring by rocking movement of the yoke 23 in the manner above described is possible.

Oil under pressure from the lubricating oil system of the engine is directed into the cylinder 27 through a passage 30 in a post 28 which communicates by means of a line 31 with the pressure lubricating system of the engine by means not shown. The governor with oil under pressure locked in the cylinder 27 functions in a conventional manner. In this particular governor a passageway 33 and conduit 34 form communication between the cylinder 27 and the engine lubricating oil sump, not shown, and a pedal actuated normally closed valve, also not shown, may be opened to permit flow through the communicating conduit 34 so that the main governor spring can expand to effect momentary deceleration of the engine. A spring 36 surrounds the posts 28 in the cylinder to limit expansion of the main governor spring when it reaches the position shown in FIG. 3 to prevent complete shutdown of the engine, all as more specifically disclosed in the above mentioned Parks patent.

The present invention comprises a valve schematically shown at 38 in FIG. 1 in the conduit 31 which supplies oil under pressure to the cylinder 27. This valve is normally closed by a spring 39 which urges a piston 40 upwardly to close an orifice 41 communicating with the cylinder 27 and open an orifice 42 forming communication between the cylinder 27 and a return line to a sump 43. Consequently when source pressure from the lubricating oil system is introduced into line 31a, it retracts the piston 41 against the force of the spring 39 to the position shown in FIG. 1 to direct oil to the cylinder 27. Thus when engine oil pressure falls below a predetermined minimum, spring 39 closes the valve and opens communication to the sump permitting the governor spring 18 to expand and reduce the speed of the engine without stopping it.

A modified form of the invention just described, or an adaptation thereof to a different type of governor, is shown in FIG. 4. The governor of FIG. 4 is fully disclosed in the United States patent to Robinson et al. No. 2,631,837 for "Centrifugal Type Engine Governor Having Hydraulically Assisted Speed Setting Controls" and those parts which are common to the governor of FIG. 1 will be designated by the same reference character primed. Thus, in FIG. 4 the governor housing 10' rests on a fuel pump housing 11' and has a driven shaft 12' to carry rotatable flyweights, one of which is shown at 13' acting on a thrust collar 14' to adjust a yoke 15' which adjusts suitable fuel metering linkage, not shown. A main governor spring 18' urges a spring seat 20' upwardly with respect to a cylinder 27' which in this case is slidable with respect to a cylindrical extension 50 in the governor housing. This extension 50 closes the upper end of the cylinder 27' and the lower end is closed by a flange 51 on the spring seat 20' with the exception of openings formed by slots 52 in the lower edge of the cylinder. The cylinder 27' has an external groove 53 for the reception of a yoke, not shown, but similar to that shown at 23 in FIG. 1, and manually controlled through suitable linkage, for raising and lowering the cylinder. Oil under pressure is supplied to the interior of the cylinder through a line 31' and passages 55. Lubricating oil under pressure within the cylinder opposes the force of the governor spring tending to compress it and a servo or booster has been provided. Engine speed is regulated by sliding the cylinder 27' upwardly or downwardly to vary the size of the slots 52 through which oil can escape and thus vary the oil pressure which is effective to adjust the setting of the governor. A valve 38' identical to the valve 38 in FIG. 1 is therefore effective to decelerate the engine upon failure of oil pressure. In this construction a pair of rings shown in Patent 2,631,837 to limit the movement of the cylinder 27' are not used and a spring 36' prevents complete shutdown of the engine upon failure of oil pressure.

The present invention has been described herein in its application to two existing types of governors, both of which include a body of oil under pressure exerting compressive force on the main governor spring. It will be obvious, however, that the invention is equally as well adaptable to other governors by providing means for exerting lubricating oil pressure on the governor spring. Such a structure for example could be like the disclosure of FIG. 1 with the passage 33 and conduit 34 omitted, or like the structure of FIG. 4 with the slots 52 omitted and the governor spring seat 20' secured against sliding movement in the cylinder 27'.

To simplify the foregoing disclosure the valve 38 has been shown schematically and separate from the governor housing. However, in practice for reasons of design and economics it may be included as an integral part of the governor.

We claim:

1. Apparatus to reduce the speed setting of a spring loaded flyweight type engine governor upon failure of engine lubricating oil pressure which comprises means to confine oil in a position to exert compressive force on the governor spring, conduit means communicating between said confining means and a source of lubricating oil under pressure, a normally closed valve in said conduit means, and means operable while oil is under pressure in the conduit means to open said valve to admit oil to said confining means and operable when the pressure falls below a predetermined minimum to close said valve and vent said confining means.

2. The invention of claim 1 in which the valve is normally closed by a spring and in which a vent to the confining means is opened by the same valve when it is in its closed position.

3. The invention of claim 1 in which the governor spring has a seat and the confining means is a cylinder closed at one end by said seat, the seat being slidable in the cylinder.

4. The invention of claim 1 in which a spring exerting less force than the governor spring is disposed to oppose expansion of the governor spring to prevent complete shut down of the engine controlled thereby.

References Cited in the file of this patent
UNITED STATES PATENTS

| | | |
|---|---|---|
| 2,260,576 | Maybach | Oct. 28, 1941 |
| 2,474,232 | Dach | June 28, 1949 |
| 2,894,502 | O'Brien | July 14, 1959 |
| 2,960,082 | Smith | Nov. 15, 1960 |